United States Patent Office 3,167,604
Patented Jan. 26, 1965

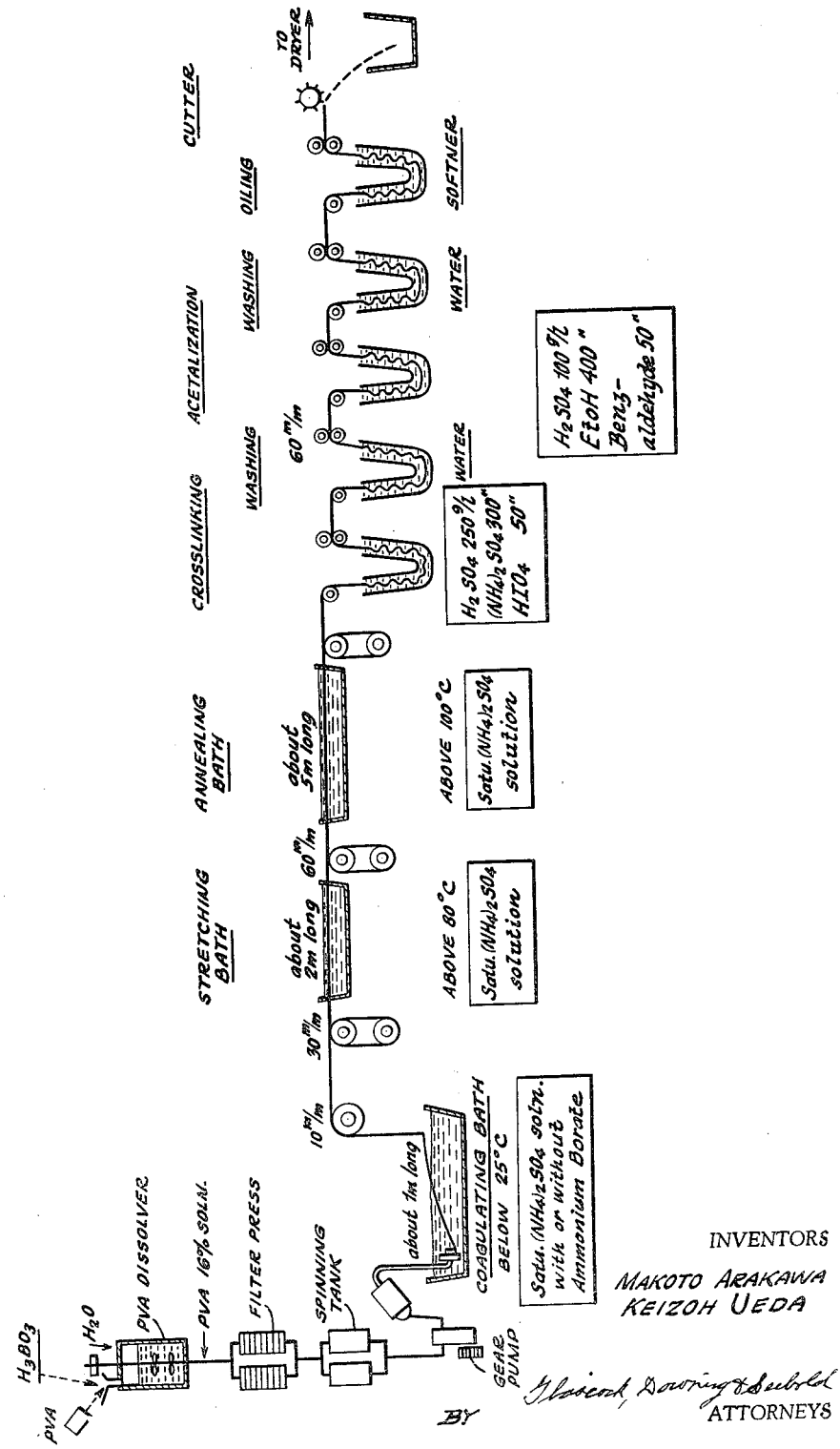

3,167,604
PROCESS FOR THE PRODUCTION OF FIBROUS PRODUCTS CONSISTING OF POLYVINYL ALCOHOL OR ITS DERIVATIVES
Makoto Arakawa, Joto-ku, Osaka-shi, and Keizoh Ueda, Nishinomiya-shi, Japan, assignors to Kanegafuchi Boseki Kabushiki Kaisha, known as Kanegafuchi Spinning Co., Ltd., Tokyo-to, Japan
Filed Dec. 21, 1959, Ser. No. 860,698
Claims priority, application Japan, Apr. 13, 1959, 12,017/59
4 Claims. (Cl. 264—185)

The invention relates to a process for the production of fibrous products consisting of polyvinyl alcohol or its derivatives.

As is commonly known, fibrous products of "Vinylon," consisting of polyvinyl alcohol and its derivatives, are produced in general by the way of wet spinning, drawing, heat-treating and acetalizing.

There are three kinds of heat-treatment in this respect and known per se. For instance, Japanese Patent No. 157,076, granted on June 16, 1943, to the Nippon Chemical Fibres Research Foundation discloses a dry heating process, and Japanese Patent No. 193,538, granted on November 12, 1952, to Kurashiki Rayon Kabushiki Kaisha reveals a steaming process, while Japanese Patent No. 153,812, granted on November 20, 1942, to Kanegafuchi Boseki Kabushiki Kaisha proposes a wet heating process. Thus, it has been believed by those skilled in the art, that a proper heat-treatment is a requisite condition to produce enough hot-water-durable polyvinyl alcohol fibrous products. More specifically, it was recommended in the dry heating process as above mentioned, that spun products are to be treated at a temperature of 215° C. with an allowable margin of plus or minus 5° C., for five to eight minutes. Further, as an example for steaming, it was preferred to treat spun products in steam atmosphere at 140° C., having a relative humidity of about 80% as long as for an hour. In wet heating, it was reported that spun products were advantageously treated in a heating medium, such as a 45–50% ammonium sulfate aqueous solution, at 130–140° C. for one or two hours and under tension. If the heat-treating conditions should deviate from those above specified, the desired "Vinylon" fibrous products having an enough durability against the effect of boiling water could not be obtained, even if the formalizing process has been most carefully carried out.

Substantial difficulties are, however, frequently met in the course of industrial heat processing of spun products as above mentioned within specified limits. For instance, in the case of dry heat-treatment, higher temperatures as caused by inadequate temperature control will result in discolored or coagulated products or both, while, on the other hand, lower temperatures will lower the hot-water-durability of products to a substantial degree. Since, in the wet-heating process, the heat-treating temperature can not be elevated to the desired value under the normal pressure, pressurization will be requisite for the desired purposes. For industrial realization of the process, special provision should be made so as to treat spun products continuously and under pressure, as disclosed, for instance, in Japanese Patent No. 186,360, granted on January 19, 1951, to Kanegafuchi Boseki Kabushiki Kaisha. Thus, it would be highly advantageous and simplified for the production of "Vinylon" products, if such heat-treating process could be dispensed with, or carried out at least under more moderate conditions.

On the other hand, hitherto marketed formalized fibrous products of "Vinylon" normally show durable temperatures 110–115° C., at which the tested products represent an allowable contraction of 5%, when they are dipped in the hot water bath for five minutes. When these products are subjected to benzalization to improve their elastic property, the hot-water-durability as determined in the above mentioned manner will be decreased to 100–105° C. Generally speaking, if "Vinylon" is used for the production of textile fabrics such as for clothing, the durable temperature as mentioned above is preferably higher than 120° C.

A main object of the invention is to provide an improved process for the production of "Vinylon" fibrous products wherein the above mentioned troublesome heat-treating step can be dispensed with.

A further object of the invention is to provide an improved process of the kind mentioned above, according to which process fibrous materials or goods having higher hot-water-durability than that of conventional "Vinylon" are produced.

Still a further object of the invention is to provide an improved process of producing fibrous materials or products of polyvinyl alcohol and its derivatives having higher strength.

Further objects and advantages of the invention will become more readily apparent from the accompanying drawing, in which the single figure diagrammatically illustrates the process steps of the invention.

For the realization of the aforementioned objects, the process according to the invention comprises in general the following four steps in succession:

(1) First step, comprising: preparing a spinning solution consisting of an aqueous solution of polyvinyl alcohol containing boric acid; preparing a coagulating bath containing at least a dehydrating salt or salt mixture, such as Glauber's salt, ammonium sulfate and the like, or a mixture of one or more of said substances with borax, ammonium borate and/or alkaline borate; and extruding said spinning liquid into said coagulating bath (hereinafter referred to as "boric acid spinning step").

(2) Second step: subjecting the thus spun products to contraction, if necessary.

(3) Third step: subjecting the thus obtained fibrous material to a reaction in an acid solution with an oxidizing agent, which acts to cutoff the 1,2-glycol linkage of the polyvinyl alcohol (hereinafter referred to as "cross-linking step"), and (4) Fourth step: acetalizing by addition of an aldehyde.

The combination of said first step with said third one is requisite for carrying out the invention. If necessary, however, any suitable combination such as that of the first, second and third steps; first, third and fourth steps; or first, second, third and fourth steps may be employed for specific purposes and with superior results.

The reaction mechanism of the aforementioned cross-linking will be explained more in detail hereinbelow:

As is known, almost all monomers contained in polyvinyl alcohol are of the 1,3-glycol combination, while about 1 mol. percent thereof contains the 1,2-glycol combination (see Florg; Poly. Sci., vol. 3881). According to the third step of the inventive process, polyvinyl alcohol fibrous material is treated in an acid solution with an oxidizing agent such as periodic acid ($HIO_4$) for reaction therewith to cut-off the 1,2-glycol linkage thereby forming aldehyde which will then act to form an acetal-combination with another polyvinyl alcohol molecule to realize a kind of intermolecular cross-linkage.

For this reason, polyvinyl alcohol fibrous products can be made water-insoluble merely by treating with periodic acid. However, in this case, since the end portions formed by the abovementioned cut-off or interruption may not always react to realize said intermolecular cross-linking, some decrease in strength of the fibrous material will be unavoidably accompanied thereby. Thus, for carrying out the present step, employment of relatively stronger spun products to be treated with periodic acid is absolutely necessary. The above mentioned first step, i.e. boric acid spinning method is highly recommended, on account of its superior performance to give polyvinyl alcohol fibrous material having enough higher strength.

As oxidizing agents to cut-off the 1,2-glycol linkage in polyvinyl alcohol, lead tetraacetate ($Pb(C_2H_3O_2)_4$), osmium oxide or the like, or salts thereof, may be used in place of or in addition to periodic acid.

Now, turning to the above mentioned first step, the reason why such products having higher strength may be thereby obtainable will be explained: It is commonly known that boric acid or borax may act as an accelerating agent for the formation of the aforementioned intermolecular cross-linkage on polyvinyl alcohol, thus urging the gel-formation of an aqueous solution of polyvinyl alcohol (see, for instance, Motoyama and Okumura's treatise, "Kobunshi Kagaku" ("High-Molecular Chemistry"), vol. 11, No. 23). This tendency of gel-formation will be more appreciable the lower the temperature and the higher the pH value.

Polyvinyl alcohol has a strong tendency to crystallize. Even a powder of the alcohol, which has been obtained by sedimentation from the solution, gives an X-ray photograph having crystalline representations therein (see Sakurada and Funchino's treatise, "Goseii Seni Kenkyu" ("Researches in Synthetic Fibres"), vol. 1, No. 1, page 29). As will be supposed from these facts, some degree of crystallization will take place at the beginning of spinning in the case of wet-spinning of aqueous polyvinyl alcohol solution, so that attempts to draw the spun products by introducing them under tension into a drawing bath of higher temperature will not improve substantially the molecular orientation of the products. On the other hand, according to the boric acid spinning method employed in the invention, the extruded aqueous polyvinyl alcohol solution is first gelled by being subjected to cross-linking action by the boric acid, and is thereafter slowly dehydrated, thereby being prevented from intermolecular crystallizing. When the thus treated products are transferred to the drawing bath of higher temperature, the cross-linkage by the intermediary of boric acid is resolved and then the products are subjected to the desired draft, thus improving the molecular orientation of the treated products. In this manner, polyvinyl alcohol fibrous material having enough higher strength may be produced.

Spun and drawn polyvinyl alcohol represents normally localized uneven draft when seen from the view point of molecular construction. By providing some degree of contraction to the spun and drafted products according to the second step of the invention, these local irregularities can be removed. By this procedure, the products become more liable to be crystallized and cross-linked, thus a higher hot-water-durability will be obtained by further treating with periodic acid or the like, and then acetalizing, if necessary; but, indeed, without employing the conventional heat-treating.

By employing either combination of the aforementioned processing steps of first and third, or of first, second and third, enough strong and boiling-water-insoluble polyvinyl alcohol fibrous products may be obtained. Although these products are made boiling-water-insoluble by the aforementioned partial cross-linking, they possess yet a number of hydroxyl groups and thus a corresponding hydrophilic property, which means naturally an undesirable drawback. By acetalizing, the hot-water-durability can be improved. Further, acetalizing by means of, for instance, benzaldehyde, the elasticity of the treated products may be also increased on account of steric hindrance, thereby causing otherwise possible side chain reactions. By either formalizing or benzalizing polyvinyl alcohol fibrous products obtained by the combined processing comprising said first, second and third steps, the hot-water-durability may be increased to 130° C. or 120° C., respectively.

Next, the possible and ascertained influences on the desired effects by changing the operating conditions in the aforementioned processing steps will be described hereinunder:

By employing the boric acid spinning method as a requisite step to carry out the invention, transparent polyvinyl alcohol fibrous material, having no sponge-like construction, can be obtained as a secondary effect of the invention. Further, by adjusting the dosed quantity of boric acid in the spinning solution and/or that of the acid in the coagulation bath, and/or by adjusting the pH and temperature of the bath, the cross-sectional configuration of the fibres may be freely modified without loss of the transparent nature thereof. It was found that the spinning conditions to produce transparent polyvinyl alcohol correspond substantially to those necessary to obtain enough draft in the fibres. In this respect, reference shall be had to the optimum conditions for production of transparent polyvinyl alcohol fibrous material, as disclosed in the copending Japanese patent application. These optimum operating conditions, thus, may be applied to the present invention to obtain the required drawing degree. More specifically, the larger the quantity of boric acid added to the spinning solution and the higher the pH value of the coagulating bath and the higher the temperature of the bath, the higher will be the gelling of the polyvinyl alcohol thus spun, and thus a higher degree of drawing may be adopted without difficulty, thereby providing the possibility for the production of polyvinyl alcohol fibrous products having higher strength. In connection with the other favourable spinning conditions, reference shall be had to several examples of the inventive process as set forth hereinafter.

In order to give contraction in the second step, which may be dispensed with if necessary, as already explained, the spun and drafted polyvinyl alcohol fibrous material is led through a hot bath containing salt constituents similar to those contained in the preceding coagulating bath and the delivery speed is selected somewhat lower than the incoming speed. The degree of contraction is selected preferably to be 0–30%. Assuming other conditions be given, the higher the contraction, the higher will be the hot-water-durability. With too much contraction, the strength of the obtained fibres will be correspondingly decreased and at the same time the degree of possible elongation will be appreciably increased. Thus, in consideration of these facts, the degree of contraction in this processing stage should be properly limited.

On the other hand, the optimum operating conditions for the intermolecular cross-linking are disclosed in Japanese Patent No. 230,077 granted on March 22, 1957, to Kanegafuchi Boseki Kabushiki Kaisha. In the spinning process as set forth therein, the cutoff of the 1,2-glycol linkage is preferably carried into effect at pH values less than 6. The velocity is higher with lower values of pH. The aldehyde group thus formed at the end portion of the cut-off molecule by oxidation will combine at elevated temperatures and at pH values less than 2, with other polyvinyl alcohol molecules to form an acetal-combination by way of cross-linking. This phenomenon causes the polyvinyl alcohol to be water-insoluble while, on the contrary, similar treatment carried out at normal temperatures will provide substantially no effect in this respect.

As already described, those skilled in the art have thought and judged that the heat-treating process is one of the absolutely necessary conditions under which polyvinyl alcohol fibrous material is produced by spinning. However, in the case of production of spun goods by way of heat-treating as an after-treatment thereof, partial agglutination will unavoidably take place unless the processing conditions, either in the dry or wet-treating process, are controlled within precise limits. These gelatinized parts are difficult to be acetalized, thus representing a lower degree of hot-water-durability, being liable to be overdyed when dyed. These defective products are difficult to separate into individual filaments, for instance, in roving processes on flyer frames. The agglutinative filaments or fibres are woven in mixed state into the textile fabrics, which represent thus fatal defects when they are used, especially for underwears. According to the present invention, however, such difficulties and disadvantages frequently met with in the conventional process, may be completely obviated. Thus, it is conclusive that the unemployment of the conventional heat treatment in the present invention does represent a remarkable inventive step. As is well acknowledged by those skilled in the art, hitherto known fibrous materials comprising polyvinyl alcohol or its derivatives have high enough higher values of tensile strength as well as of frictional resistance and durability, but they possess inferior elastic natures relative to other kinds of synthetic fibres, which defect is highly desirous to be overcome. Attempts have been made for this purpose, for instance, acetalization by means of nonyl aldehyde, benzaldehyde or the like, except formaldehyde has been hithertofore proposed to improve the elasticity of the fibrous materials of the kind as above mentioned. When polyvinyl alcohol fibres are acetalized by means of rather unfamiliar aldehydes as acetalizing agents, the hot-water-durability is decreased to a substantial degree.

Conventionally produced polyvinyl alcohol fibres are normally of horse-shoe-like cross-section and the final products represent appreciable, artificial silk tone glaze, even after treatment, for instance, with titanium, as a delustering agent. On the contrary, monofils made in accordance with the boric acid spinning step in this invention may have any desired full cross-section, thus the final products produced therefrom may possess moderate and elegant lustre which are highly welcomed by the consumers thereof.

The products produced in accordance with the invention possess improved dyeing characteristics, which are also attributable to the boric acid spinning. Products made according to the boric acid spinning process show, as already explained, no sponge-like inner construction, but are of a transparent nature, which, with a given quantity of dyeing agent absorbed therein, may have more clear and deeper tone than that obtained with the sponge-like construction.

The following examples illustrate the invention, the percentages being by weight.

*Example 1.—Combination of processing steps 1 and 3*

A 20% aqueous solution of polyvinyl alcohol, having a mean polymerization degree of 1350, added with 1% of boric acid relative to the polyvinyl alcohol, was extruded through a multiple hole spinneret into a coagulating bath containing ammonium sulfate 500 grs./lit. an, ammonia 4 grs./lit., and held at 20° C. After a bath travel of approximately 100 centimeters, the monofilaments were drawn to three times their length in the air. The thus treated monofils were further drawn two times in a second bath at 80° C. containing a saturating quantity of ammonium sulfate. The drawn monofils were cooled by the passage through a third bath at 15° C., containing a saturating quantity of ammonium sulfate. The monofils were further treated for about thirty minutes with a fourth bath at 50° C., containing $HIO_4$ 0.5% and sulfuric acid 5%. Thus obtained polyvinyl alcohol monofils represented testing values of strength and elongation of 3.5 grs./denier and 28%, respectively. The durable temperature in hot water according to the testing method described hereinbefore amounted to 110° C.

*Example 2.—Combination of processing steps 1, 2 and 3*

A 20% aqueous solution of polyvinyl alcohol, having a mean polymerization degree of 1450, added with 0.8% of boric acid relative to the polyvinyl alcohol, was extruded through a multiple hole spinneret into a coagulating bath at 15° C. containing ammonium sulfate 505 grs., ammonia 7 grs. and boric acid 20 grs. per litre, respectively. After a bath travel of approximately 100 centimeters, the monofilaments were drawn to three times in the air. The thus treated monofils were further drawn to two times their length in a second bath at 80° C. containing a saturating quantity of ammonium sulfate. The drawn monofils were cooled by passage through a third bath at 15° C. containing a saturating quantity of ammonium sulfate. The monofils were further treated for about twenty minutes with a fourth bath at 100° C. consisting of a 35% ammonium sulfate solution, to give about 15% shrinkage to the monofils which were then finally treated in a fifth bath of a benzene solution at 50° C. for about thirty minutes containing lead acetate $Pb(C_2H_3O_2)_4$ 1%, sulfuric acid 5%, ethanol 30% and water 10%. Thus treated polyvinyl alcohol monofils represented testing values of strength and elongation of 3.3 grs./denier and 30%, respectively. The durable temperature in hot water amounted to 105° C.

*Example 3.—Combination of processing steps 1, 2 and 4*

A 20% aqueous solution of polyvinyl alcohol having a mean polymerization degree of 1350, added with 0.8% of boric acid relative to the polyvinyl alcohol, was extruded through a multiple hole spinneret into a coagulating bath at 40° C. containing Glauber's salt 380 grs. and caustic soda 2 grs. per litre, respectively. After a bath travel of approximately 100 centimeters, the monofilaments were drawn to three times their length in a second bath saturated with Glauber's salt at 65° C. and to three times length in a third bath of the same kind, again at 65° C. Thus drawn monofils were treated in a fourth bath at 50° C. for about thirty minutes containing $HIO_4$ 1% and sulfuric acid 5%, and further in a fifth bath at 50° C. for about thirty minutes containing formaldehyde 5%, Glauber's salt 25% and sulfuric acid 20%, for formalizing. Thus treated "Vinylon" monofils represented testing values of strength and elongation of 4.1 grs./denier and 22%, respectively. The durable temperature to represent a 5% contraction in hot water amounted to 130° C.

*Example 4.—Combination of processing steps 1, 2, 3 and 4*

A 20% aqueous solution of polyvinyl alcohol having a mean polymerization degree of 1350, added with 0.8% of boric acid relative to the polyvinyl alcohol, was extruded through a multiple hole spinnret into a coagulating bath at 30° C. containing Glauber's salt 380 grs. and boric acid 10 grs. per litre, respectively. After giving a 10% contraction by treating in a second bath at 100° C. containing a saturating quantity of Glauber's salt, the produced monofils were treated in a third bath at 50° C. for about thirty minutes containing $HIO_4$ 0.5% and sulfuric acid 5%. Thus treated monofils were further treated in an aqueous solution at 50° C. for thirty minutes containing benzaldehyde 5%, sulfuric acid 10% and ethanol 30%, for benzalification. Thus produced and treated "Vinylon" monofils were of a higher elasticity, and represented testing values of strength and elongation of 3.5 grs./denier and 23%, respectively. The durable temperature representing a 5% contraction in hot water amounted to 120° C.

*Example 5*

A 20% aqueous solution of polyvinyl alcohol having a mean polymerization degree of 1350, added with 0.8% of boric acid relative to the polyvinyl alcohol, was extruded through a multiple hole spinneret into a coagulating bath at 10° C. having a bath travel of approximately 100 centimeters containing ammonium sulfate 500 grs. and ammonium borate 25 grs. per litre, respectively. After giving a 300% draw in the open atmosphere, the monofils were further subjected to a 200% draw by passing them through a second bath at 80° C. comprising a saturated aqueous solution of ammonium sulfate and then cooled by leading them through a third bath at 15° C. consisting again of a saturated aqueous solution of ammonium sulfate. After giving a 5% contraction by keeping in a 35% aqueous solution of ammonium sulfate at 100° C. for about twenty seconds, the monofils were treated in a further bath at 40° C. for 15 minutes containing $HIO_4$ 3% and $H_2SO_4$ 4%, and then subjected to benzalfication by treating in an aqueous solution at 50° C. for about thirty minutes containing benzaldehyde 5%, sulfuric acid 10%, and ethanol 30%. Thus obtained highly elastic monofils showed a strength-elongation value of 3.8 grs./denier-25%, and a durable temperature as already defined, of 120° C.

*Example 6*

A 20% aqueous solution of polyvinyl alcohol having a mean polymerization degree of 1350, added with 1.5% of boric acid relative to the polyvinyl alcohol, was extruded through a multiple hole spinneret into a coagulating bath at 20° C. having a bath travel of approximately 100 centimeters and containing ammonium sulfate 500 grs. and ammonia 8 grs. per litre, respectively. After giving a 300% draw in the open atmosphere, the monofils were further subjected to a 200% draw by passing them through a second bath at 80° C. comprising a saturated aqueous solution of ammonium sulfate and then cooled by leading them through a third bath at 20° C. consisting again of a saturated aqueous solution of ammonium sulfate. After giving a 15% contraction by keeping in a 35% aqueous solution of ammonium sulfate at 100° C. for about twenty seconds, the monofils were treated in a further bath at 70° C. for about an hour containing $HIO_4$ 1%, $HIO_3$ 2%, sulfuric acid 5% and ammonium sulfate 4%, and then subjected to benzalfication by treating in an aqueous solution at 50° C. for about thirty minutes containing benzaldehyde 5%, sulfuric acid 10% and ethanol 30%. Thus obtained highly elastic monofils showed a strength-elongation value of 3.2 grs./denier-32%, and a durable temperature as already referred to, of 120° C.

*Example 7*

A 20% aqueous solution of polyvinyl alcohol having a mean polymerization degree of 1350, added with 1% of boric acid relative to the polyvinyl alcohol, was extruded through a multiple hole spinneret into a coagulating bath at 20° C. having a bath travel of approximately 100 centimeters and containing ammonium sulfate 500 grs. and ammonia 4 grs. per litre, respectively. After giving a 300% draw in the open atmosphere, the monofils were further subjected to a 200% draw by passing them through a second bath at 80° C. comprising a saturated aqueous solution of ammonium sulfate and then cooled by leading them through a third bath at 20° C. consisting again of ammonium sulfate. After giving a 15% contraction by keeping in a 35% aqueous solution of ammonium sulfate at 100° C. for about twenty seconds, the monofils were treated in a further bath at 40° C. for about five minutes consisting of a 2% aqueous solution of $HIO_4$. The lightly squeezed monofils were further treated in an aqueous bath at 70° C. for about thirty minutes containing sulfuric acid 4% and Glauber's salt 3%. Thus treated monofils were still further treated in an aqueous solution at 50° C. for about thirty minutes containing benzaldehyde 5%, sulfuric acid 10% and ethanol 30%, for benzalfication. Thus spun and treated products were of a higher elasticity, and represented testing values of strength and elongation of 3.0 grs./denier and 30%, respectively. The durable temperature as defined hereinbefore amounted to 120° C.

Although several preferred embodiments of the invention have been described in detail in the foregoing specification, it is to be expressly understood that the invention is not limited thereto. From the foregoing it will be obvious that the principle of the invention may be carried into effect by means of a wide variety of specific process steps, that various features may be combined in different ways and that certain features may be employed to the exclusion of others. The invention is accordingly understood to embrace all forms and embodiments falling within the scope of the appended claims.

We claim:
1. A method for the preparation of fibrous products comprising extruding an aqueous solution of polyvinyl alcohol containing boric acid into a coagulating bath, thereafter treating the thereby extruded and coagulated material with a solution at a pH of between 2–6 containing an oxidizing agent selected from the group consisting of periodic acid, lead tetra acetate and osmium oxide.

2. A method for the preparation of fibrous products comprising extruding an aqueous solution of polyvinyl alcohol containing boric acid into a coagulating bath, thereafter treating the thereby extruded and coagulated material with a solution at a pH of between 2–6 containing an oxidizing agent selected from the group consisting of periodic acid, lead tetra acetate and osmium oxide, then acetalizing the oxidized product with an aldehyde.

3. A method for the preparation of fibrous products comprising extruding a 20% by weight aqueous solution of polyvinyl alcohol containing boric acid in an amount of between 0.8%–1.5% by weight relative to the polyvinyl alcohol into a coagulating bath, thereafter treating the thereby extruded and coagulated material with a solution at a pH of between 2–6 containing an oxidizing agent selected from the group consisting of periodic acid, lead tetra acetate and osmium oxide.

4. A method for the preparation of fibrous products comprising extruding a 20% by weight aqueous solution of polyvinyl alcohol containing boric acid in an amount of between 0.8%–1.5% by weight relative to the polyvinyl alcohol into a coagulating bath, thereafter treating the thereby extruded and coagulated material with a solution at a pH of between 2–6 containing an oxidizing agent selected from the group consisting of periodic acid, lead tetra acetate and osmium oxide, then acetalizing the oxidized product with an aldehyde.

References Cited by the Examiner
UNITED STATES PATENTS
2,236,061  3/41  Izard.
2,749,208  6/56  Cline _____ 8—115.5

OTHER REFERENCES
Jones: "British Plastics," pages 77–83, February 1944.

ALEXANDER H. BRODMERKEL, *Primary Examiner.*
WILLIAM J. STEPHENSON, MICHAEL V. BRINDISI, MORRIS LIEBMAN, *Examiners.*